United States Patent [19]

Tolmie, Jr.

[11] Patent Number: 4,924,106
[45] Date of Patent: May 8, 1990

[54] ENVELOPE FLAP PROFILING APPARATUS

[75] Inventor: Robert J. Tolmie, Jr., Brookfield, Conn.

[73] Assignee: Pitney Bowes Inc., Stamford, Conn.

[21] Appl. No.: 291,092

[22] Filed: Dec. 28, 1988

[51] Int. Cl.⁵ ............................................ G01N 21/86
[52] U.S. Cl. ...................................... 250/561; 356/376
[58] Field of Search ................ 250/202, 561; 356/376

[56] References Cited

U.S. PATENT DOCUMENTS

| | | | |
|---|---|---|---|
| 4,389,971 | 6/1983 | Schmidt | 118/669 |
| 4,419,384 | 12/1983 | Kane et al. | 427/57 |
| 4,428,794 | 1/1984 | Hayskar et al. | 156/442.1 |
| 4,491,490 | 1/1985 | Ehret et al. | 156/64 |
| 4,691,912 | 9/1987 | Gillmann | 271/10 |
| 4,694,153 | 9/1987 | Bejczy | 250/202 |
| 4,711,579 | 12/1987 | Wilkinson | 250/561 |

Primary Examiner—David C. Nelms
Assistant Examiner—Sherrie Hsia
Attorney, Agent, or Firm—Charles G. Parks, Jr.; David E. Pitchenik; Melvin J. Scolnick

[57] ABSTRACT

Apparatus and method for mapping the profile of an envelope flap using an array of sensors of the optical reflective type in which certain optical emitters and certain optical detectors are activated in a sequence to accurately detect and record multiple edge points on a moving flap.

10 Claims, 5 Drawing Sheets

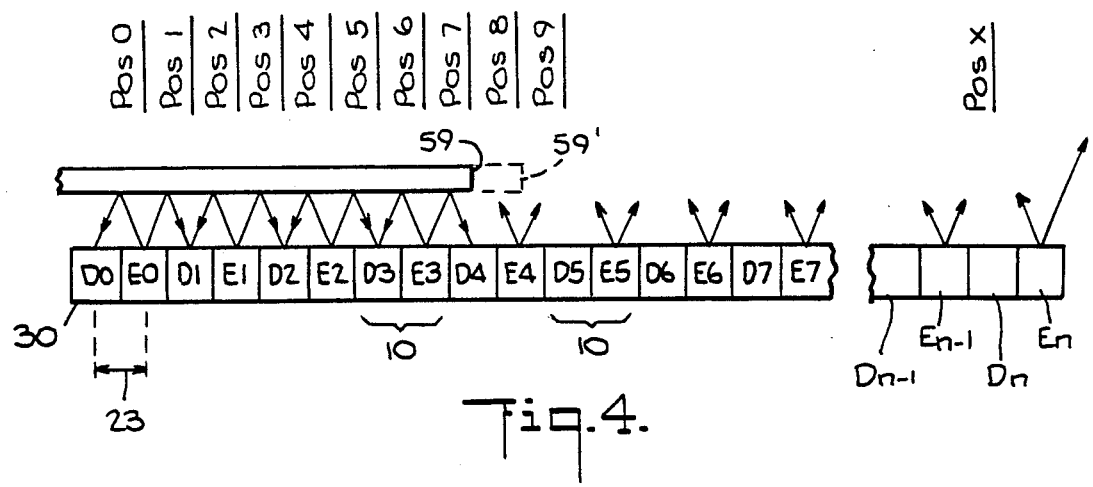
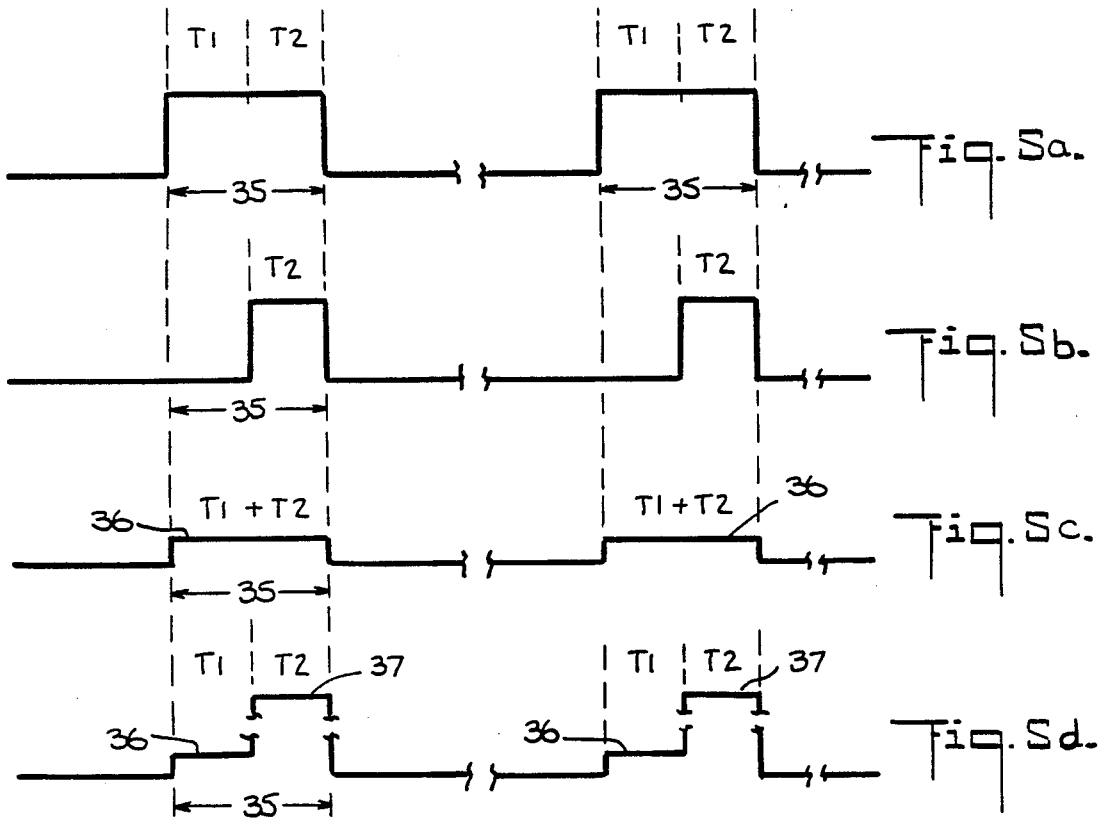

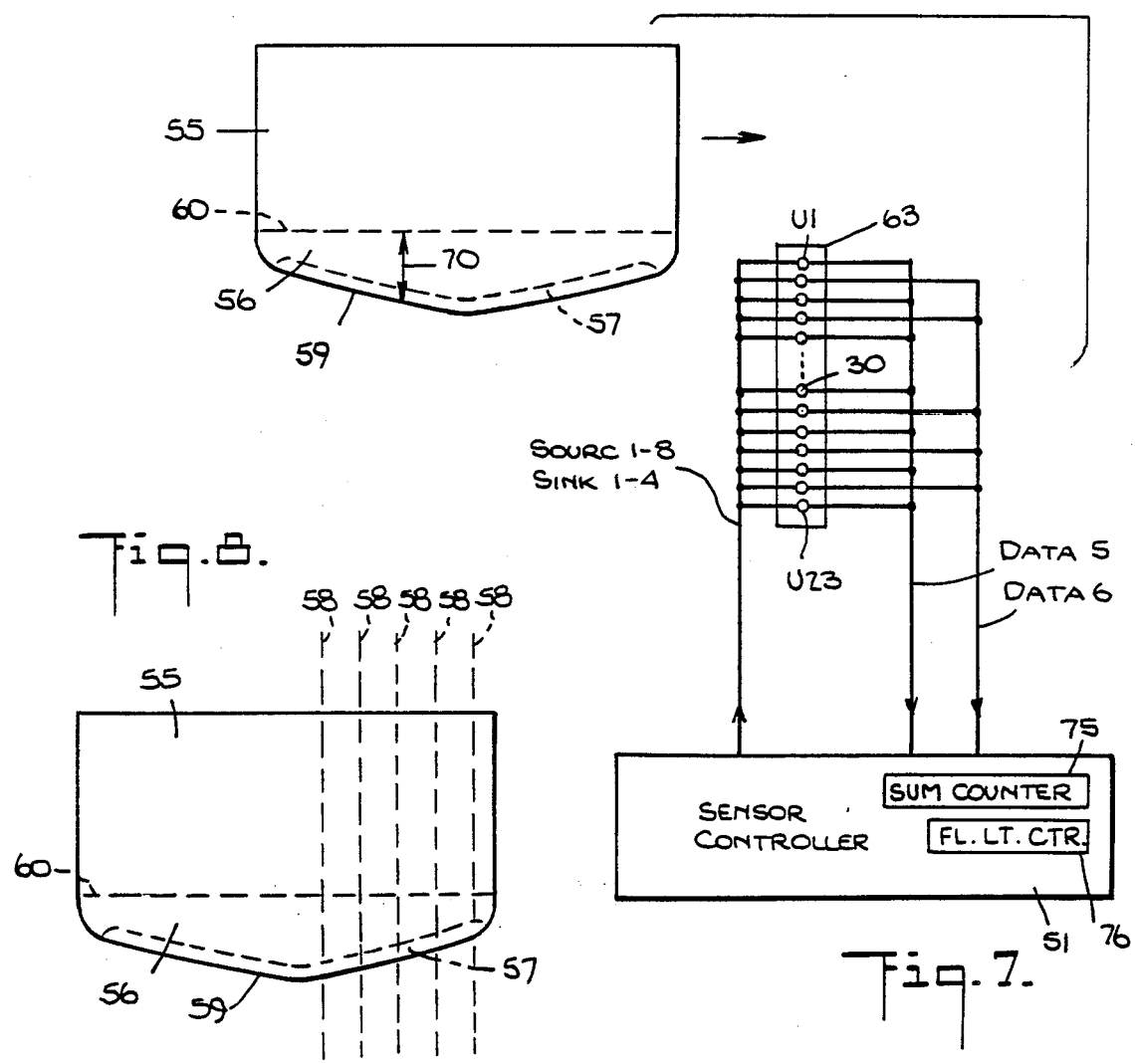

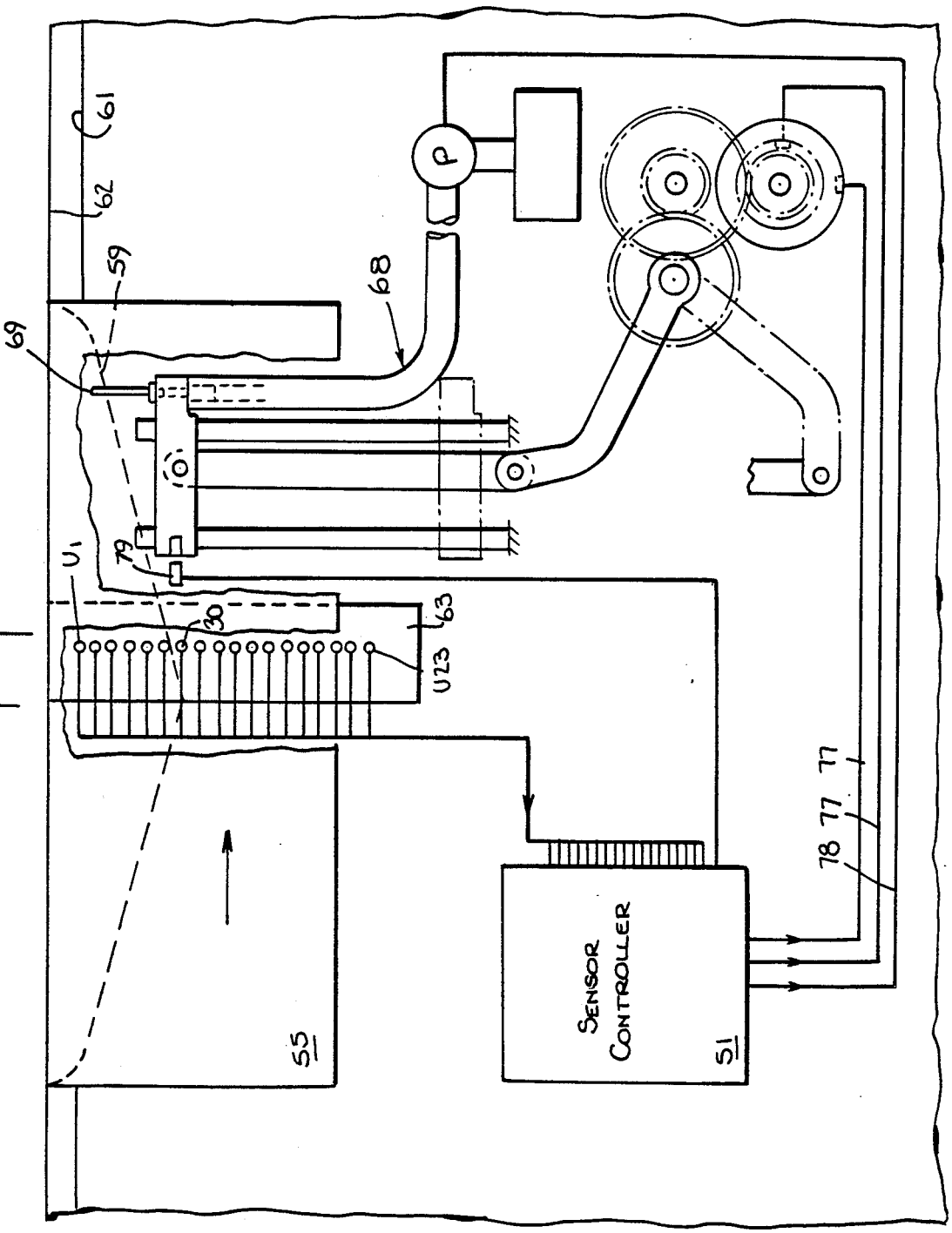

ENVELOPE FLAP PROFILING APPARATUS

FIELD OF THE INVENTION

This invention relates to apparatus and a method for determining the profile of an object, and in particular to such apparatus and method for mapping the profile of an envelope flap in a mail handling machine for processing mixed mail.

BACKGROUND OF THE INVENTION

Modern mail-handling machines processing unsealed envelopes typically include a moistener for moistening the flap and then sealing the flap before passing on the envelope to a weigher and postage meter. Moisteners typical of the known machines included a moistened water wheel, solid or of wicking material, over which the glue-line side of the flap was passed. Commonly-assigned U.S. Pat. No. 3,911,862 describes a spraying system, wherein a nozzle, moved to follow the flap edge, sparys water on the flap as it passes by the nozzle. As the speed and reliability demands made of such machines increase, such moisteners do not always operate entirely satisfactorily. The spray moistener described in the referenced patent, which essentially sprays water over three large overlapped areas, has the drawback that it is not well applicable to a machine processing a large variety of envelope shapes and sizes, such as Nos. 6, 10 and 15 envelopes. Moreover, the spray nozzle cannot accurately track and be confined to the glue line, but tends to wet flap areas outside of the glue line.

The copending application, Ser. No. 291,095 (C-435) describes an improved moistener comprising a hypodermic needle which under computer control can be caused to follow accurately the glue line at the flap edge as the open-flap envelope passes overhead and to spray a metered amount of water confined to the glue line. For this moistener to operate, the computer must know the flap profile. If known, the computer can readily calculate the positions the spraying needle must occupy in order to confine the sprayed water to the flap glue line. To the best of our knowledge, there are no known apparatus capable of mapping the flap profile of an envelope while the envelope is being transported through a mail handling machine, much less capable of performing this function for envelope transport speeds of up to four per second.

SUMMARY OF INVENTION

An object of the invention is apparatus for determining the profile of a moving object.

A further object of the invention is apparatus for mapping the flap profile of envelopes while being transported through a high-speed mail-handling machine.

These and other objects and advantages as will appear hereinafter are achieved using an array of optical sensors operated in a reflective mode.

In accordance with one aspect of the invention, an array of reflective sensors is mounted in a line transverse to the envelope flow path such that the open flap of the envelope transverses the array. The array is activated a number of times while each flap is traversing the array. Each activation determines the position of a flap edge. The aggregate of edge positions constitutes the profile of the flap. A record of the sensor outputs thus constitutes a mapping to the flap profile.

In accordance with another aspect of the invention, the sensors each comprise side-by-side radiation emitters and detectors. When placed in a line to allow sharing of emitters by detectors in adjacent packages, the resolution or accuracy of the measurements can be increased.

Still a further aspect of the invention is a novel multiplexing scheme for the driving circuitry connections to the sensor array which reduces the required number of connections and the overhead of a controller providing the signals to activate the sensors.

Another aspect of the invention is that only a subset of the sensors is activated at a time during each flap scan, which increases the signal/noise (S/N) ratio by reducing interference from ambient radiation and scattered radiation.

SUMMARY OF DRAWINGS

Several embodiments of the invention will now be described in greater detail with reference to the accompanying drawings, wherein:

FIG. 4 is a schematic view illustrating operation of the invention;

FIGS. 5a–5d are waveforms of voltages applied to the array of FIG. 4, also to illustrate operation;

FIGS. 7 and 8 are schematic views illustrating operation of the invention;

FIG. 9 is a table explaining how the computer record of the flap profile is created;

FIGS. 10 and 11 are side and top views, respectively, showing the profiler of the invention in relation to the envelope and the moistener.

DETAILED DESCRIPTION OF PREFERRED EMBODIMENTS

The profile sensor will be used to determine the envelope flap profile so that the envelopes can be sealed using a spray nozzle to supply water. The spray nozzle can be positioned to spray just inside the envelope flap where the glue is located using the information from the sensor. The sensor preferably consists of LEDs (Light Emitting Diodes) separated by phototransistor detectors that are placed in a row so that a variable length object that reflects the light from the emitters to the detectors when passing over the assembled sensors will give an output that will show the length of edge position of a reflecting surface on the object.

The sensors are commercially available in a package that places the LED and detector side-by-side facing a common surface.

Figure 1:
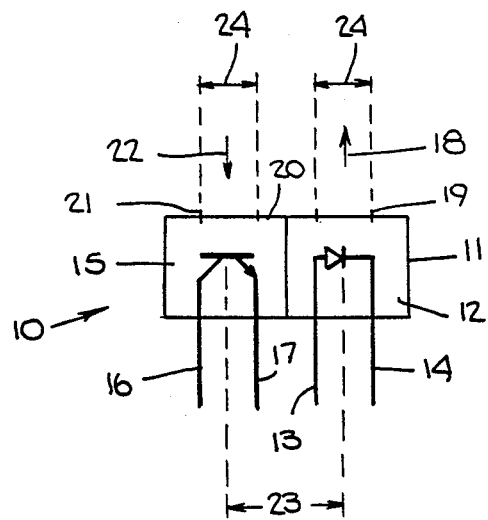
FIG. 1 is a schematic side view of one form of reflective sensor for use in the apparatus of the invention.

FIG. 1 shows a typical combination LED/detector unit 10 comprising in a single package 11 a LED 12, shown as a diode with a source lead 13 and a sink lead 14, and a silicon detector 15, shown as a base-less transistor with a collector lead 16 serving as the source lead and an emitter lead 17 serving as the sink or output lead. The LED when pulsed emits a cone-shaped radiation or light beam designated 18 through a window 19 from a common package surface 20, and the detector transistor is exposed through a window 21 at the same surface 20 to receive radiation or light designated 22. In a typical commercial unit, the center line spacing of the LED and detector, indicated by 23, is about 0.070 inches, and the widths or diameters of the LED and detector package windows 19, 21, designated 24, is about 0.050 inches.

Figure 2:
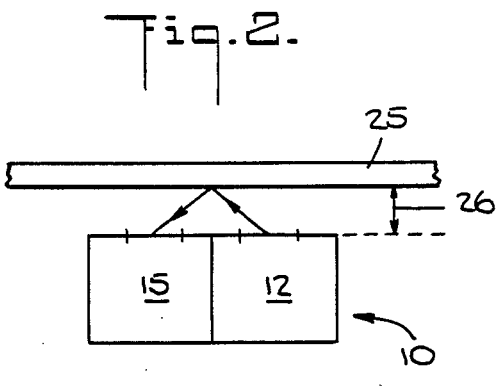
FIG. 2 is a schematic view illustrating operation of the sensor of FIG. 1.

In a typical application for the specific example given above, as depicted in FIG. 2, a reflecting surface on a member 25 positioned over the unit 10 will cause a significant increase in detector current, over its background current in the absence of the reflector 25, when the member 25 is positioned a distance 26 which, for the specific example given above, is at least 0.020 inches to about 0.125 inches.

Figure 3:
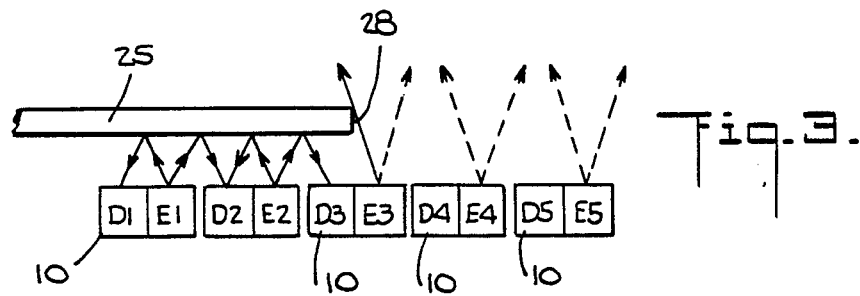
FIG. 3 is a schematic side view illustrating operation of an array of sensors of the type illustrated in FIG. 1 in an object edge determining application.

FIG. 3 shows an array of five of such sensors 10 arranged in a line, the LEDs being designated by E1-E5, and the detectors by D1-D5, and with a reflecting member 25 positioned above the active surface. As will be observed, each emitter E, when emitting a cone-shaped beam, will cause reflections to be incident not only on its own detector D, but also on the adjacent detector D. Thus, for the position of the member 25 shown, D1 and D2 will detect radiation from E1, D2 and D3 from E2, but D3 and D4 will receive little radiation from E3, and so on. The outputs from D1..D5 will thus indicate the location of the edge 28 of member 25. By arranging the units in an array as shown, double the resolution is obtained, due to the presence of detectors on opposite sides of each emitter.

A problem in this arrangement is that the reflected radiation scatters and thus D4 may receive some radiation scattered from member 25 even though the latter is not positioned above it. Similarly, D1 may receive additional radiation from E2 even though located remote from E2.

A further problem is the presence of ambient light, from artificial or natural sources, such as sunlight. Though the radiation from an artifical source may be significant, if the LED is pulsed hard, the reflected radiation will generally exceed the ambient level from an artificial source. But, when the ambient or background radiation is from sunlight, the current generated in the detector can mask and even exceed that produced by the LED.

In accordance with one aspect of the invention, a multiplexing scheme to reduce connections is provided, which still allows allows selected activation of LEDs, and selected reads of detectors, and without comprising on scatter and ambient light interferences.

Figure 6:
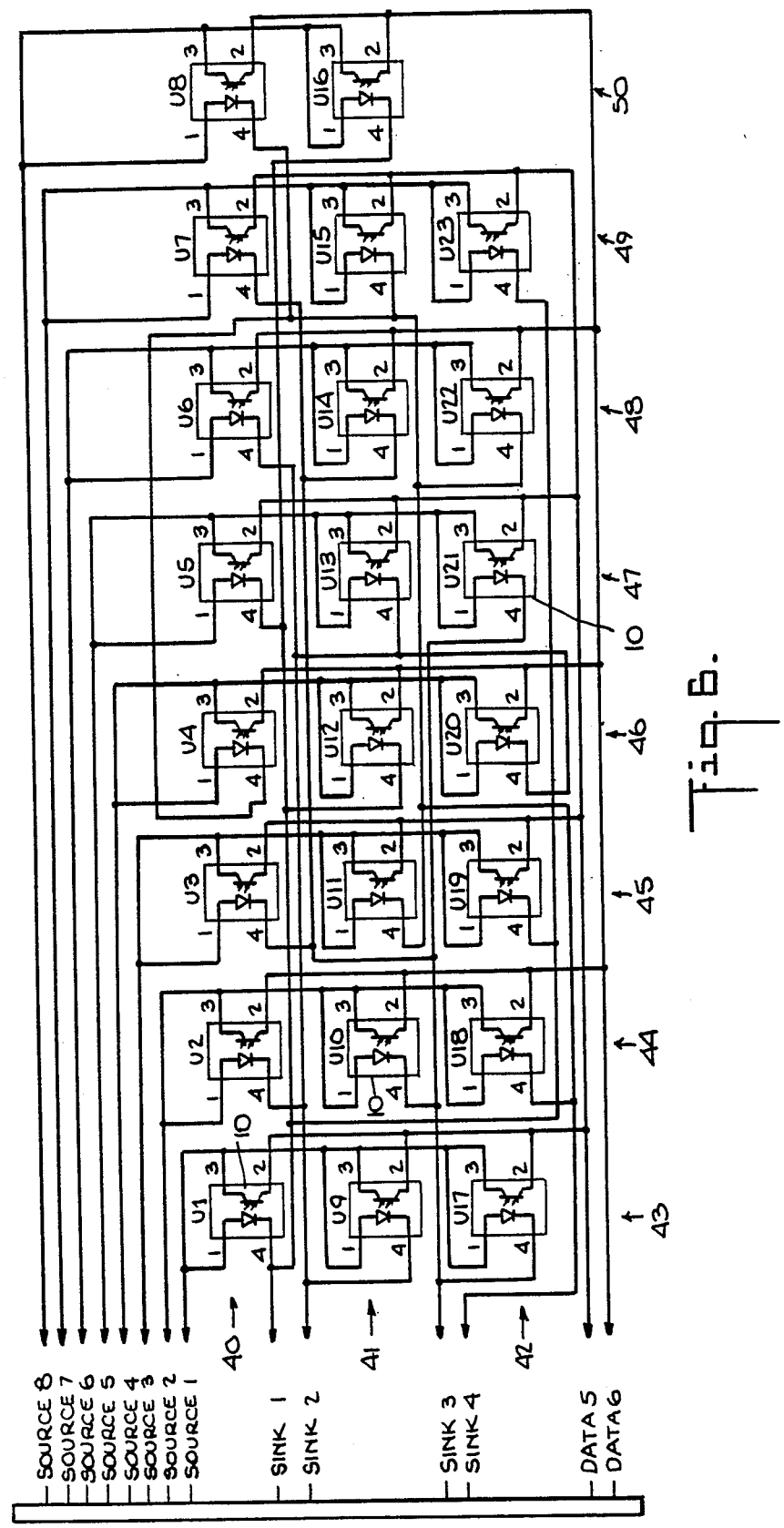
FIG. 6 is a circuit schematic for one form of driver circuitry in accordance with the invention for a 23-unit sensor.

A preferred multiplexing scheme is illustrated in FIG. 6, which comprises 23 units designated U1-U23, electrically arranged in a 3×8 matrix comprising 3 rows 40-42 of 8 columns 43-50 of units, with the first row 40, sometimes referred to as the first bank, comprising units U1-U8, and the second row 41 comprising units U9-U16, and the third row comprising units U17-U23. The 24th unit was omitted for space reasons. Thus, comparing to FIG. 4, U1 comprises D0 and E0, and U23 comprises Dn and En. Each unit has four leads designated as follows: 1 to the anode side of the LED, 4 to the cathode side, 3 to the collector of the detector transistor and 2 to the emitter. Arrows are present to show the optical connection, which exist only when a reflector is located above the unit.

For the 3×8 array shown, 8 source busses Source 1-Source 8 are provided. In accordance with this aspect of the invention, each source bus is connected to the source lines 1 and 3 of each unit in a column. Thus, Source 1 bus is connected to the source leads 1, 3 of units U1, U9, U17. The other source bus connections are evident from FIG. 6.

Sink busses 1-4 are provided for the LEDs, but connected to the LEDs in a pattern to space the connected LEDs apart, preferably as far apart as possible. Thus, the Sink 1 bus is connected to the LED sink leads 4 of units U1, U5, U12, U16, U19, U23; Sink 2 bus to units U2, U6, U9, U13, U20; and so on. In addition, 2 detector busses Data 5-6 are provided, each detector bus being connected to alternate columns of units. Thus, Data 5 bus is connected to the detector sink leads 2 of all units in columns 43, 45, 47 and 49. Data 2 bus is connected to all units in columns 44, 46, 48 and 50.

An advantage of the described arrangement is that the source, sink and detector pattern prevents one source, sink, or detector malfunction from disabling an entire section of the sensor array, and the loss of a single source, sink driver or detector line will not disable the entire profile detector.

Thus, for the 23 units shown, instead of 92 connections, only 8+4+2=14 lines to the external system controller 51 are required, a saving of 78 lines to the controller.

In a typical operation, the controller 51 would activate Source bus 1 by applying 5 volts to it. The detector busses would be selected depending on position and function of the unit, or all detector busses could be connected to a suitable circuit for reading analog currents, or for converting the analog currents via an A/D converter to a digital value and then reading the digital value. These circuits typically would be connected between the detector busses and the controller, with the resultant digital value passed on to the controller. In either case, at this point in time, none of the LEDs are activated, since none of the sink busses are grounded. Even though all of the detectors may be active, the only current flowing in the 2 detector busses Data 5 and Data 6 is that due to ambient or background radiation. As mentioned, this value is desirably measured during a first time interval, to be used as a reference.

Next, one LED sink bus is activated, as by grounding, say Sink 1. The only LEDs emitting would be those whose source lead and sink lead are both activated. For the case illustrated, Source 1 bus activates units U1, U9, U17; Sink 1 bus activates units U1, U5, U12, U16, U19, U23; it is thus evident that only unit U1 has its LED source and sink lines simultaneously activated; thus only the LED in U1 turns on. Assuming, as is typical, that the background current in the detector bus Data 5 connected to unit U1 only comes from 4 units in the row, namely U1, U3, U5, U7, this would amount to about 1 uA of current. With, say, a white document positioned over unit U1 as shown in FIG. 2, and with the diode pulsed hard, which is possible if the pulse width is short, the current generated by the detector associated with U1 is of the order of 10 mA providing an excellent signal with excellent signal/noise (S/N) ratio.

Summarizing, even though the number of connections has been drastically reduced, it is possible by means of the arrangement shown to turn on any single LED desired in the 23 unit matrix, and it is possible to read the current in its adjacent detectors and obtain a high S/N ratio by activating only a subset of the detectors in the matrix, usually the two adjacent detectors of the activated LED.

As explained in connection with the FIG. 4 arrangement, it is sometimes desirable to read the current separately in the detectors on opposite sides of the selected LED, thus detectors D1 and D2 when E1 is turned on. This is easily achieved in the circuit configuration shown in FIG. 6, because alternate units in a row are connected to different detector lines. Thus, assuming U1 corresponds to the first unit in the FIG. 4 array, and U2 corresponds to the second unit, Data bus lines 5 and 6 if separately or sequentially read when Source 1, Source 2 and Sink 1 busses are activated, will enable the controller 51 to read just the currents from the detectors in units U1 and U2 and thus be able to determine the position of the reflecting member 25. This may require the sequential activation of several LEDs and the sequential reading of several detectors, and would typically be done by the controller 51, typically a programmed or programmable micro-controller, by applying, for example, a 5 volt pulse to the desired source busses, ground or a negative voltage to the desired sink busses, and if desired ground via a series load resistor to each of the detector busses. Thus, by appropriate programming of the controller, for example a microcontroller such as the 8051, the units can be selectively activated and read in any desired sequence or pattern.

FIG. 4 is a schematic that will illustrate how the invention operates in a mapping application. An array 30 of sensors similar to that of FIG. 3 are present, the array containing n number of sensors 10, with the first containing detector D0 and emitter E0, and the last detector Dn and emitter Dn. The vertical lines above the array 30 designate successive positions of the edge of a reflecting medium. Assuming the edge is advancing over the array starting from the left side, only when the edge reaches position 0 will detector D0 receive reflected radiation from E0, but no other detectors receive reflected radiation. When the edge reaches position 1, only detectors D0 and D1 receive reflected radiation from E1. In position 2, detectors D1 alone receives radiation if only E1 is radiating. If both E0 and E1 are ON, then detectors D0 and D1 carry significant current. It is preferred to selectively activate the emitters because then the system resolution can be enhanced, explained below.

The emitters are preferably not turned ON all at once because each detector in the array shown receives reflected light from the emitter on each side e.g., in the case of D2 which would receive light from emitter 1 or emitter 2. By placing the units in the array as shown, this ability to detect reflected light at two adjacent detectors on opposite sides of each emitter doubles the resolution over a system where detector 2 detects light from emitter 2 only. In order to take advantage of this doubling of resolution, the emitters can either be turned on one at a time or no more frequently than all odd-numbered emitters then all even-numbered emitters. This can be understood by turning on both E1 and E2. If D1 and D2 are receiving reflected light but not D3, you cannot tell if the light source is from E1, or E1 and E2; but if E1 is off, the light reflected to detector 2 must be from E2 and the position must be 4. The position resolution is thus equal to the center distance 23 between detectors and emitters which in the preferred arrangement is uniform but could be designed to vary over a small range if desired. The total number of detector positions x is thus equal to 2n−1 where n is equal to the number of detector-emitter pairs.

The reflective type of sensor as above described has a number of advantages over the through beam type of sensor which has emitter and detector on opposite sides of the medium and light is blocked by the medium whose length is being measured. The same resolution with a through beam detector system would require twice as many detector elements, as well as mounting on both sides of the blocking medium, which is often highly undesirable. Moreover, an improvement in S/N ratio is obtained with the reflective sensor.

For both types of detectors, common sources of detector current include ambient light, leakage current (transistor), and transistor gain. In the transmission mode, however, a current contribution is light transmitted through a thin paper flap. This could amount to between 8-15%. This sets the maximum ON/OFF ratio to less than 12.5-1. In the worse case, it could be much lower due to thinner flaps, reduced LED output and transistor gain. The reflective sensor, however, would exhibit a detector current that would be very small until the flap was present, as it would only be the leakage and emitter light reflected from surfaces above the medium, which could be very small and is controllable by setting the distance from the detector to those surfaces to a maxium, and/or modifying those surfaces to reduce reflected light. This is because such sensors, due to the optical geometry, are mainly sensitive to light from a reflector spaced 26 between minimum and maximum distances from the active surface 20 of the sensor. The reflective sensor thus outputs a larger signal than a transmitting type of sensor when a letter flap or other target is passed over the detector. The output however, would be limited by the light reflected and the target distance. The LED output level could be increased by pulsing hard over a smaller duty cycle to increase signal level because the non-reflected signal level would be small and could be compensated for by reading the value when there is no envelope present and subtracting that value or using it to set a reference value against which the signal will be compared when the envelope is present, which could give signal to noise ratios as high as 100 to 1. This can be accomplished as illustrated in FIG. 5.

FIG. 5a depicts the pulsing waveform that can be applied to a selected detector of the array. Periodically, or randomly, the detector is turned ON, typically by applying a positive voltage to the collector lead 16, and grounding emitter lead 17 through a series load resister, across which the detector output is taken. The detector ON time 35 is T1 and T2, with, as an example but not necessary, T1=T2.

Assuming the adjacent LED is OFF, with no voltage applied or with only its anode lead activated with, say, 10 volts, then the measured current through the detector load while the detector is ON would be relatively small. For the dimensional unit described above, about 10 uA. This is illustrated at 36 in FIG. 5C.

FIG. 5b is the waveform depicting turning ON of the LED, typically by grounding its cathode lead 13 if anode lead 14 is activated. The ON LED cycle is only during time T2.

FIG. 5d shows the detector output when the voltages applied correspond to FIGS. 5a and 5b, assuming a reflecting medium 25 is present. Due to the increased illumination of the detector by the reflected light, when the LED is ON the detector current rises to a much higher level 37, typically about 10 mA. In one typical cycle operating such reflective sensors, the detector current 36 measured with the LED OFF represents ambient current used as a reference to judge the presence of a reflector when the selected LED is ON. Typically, the current level 36 would be used to set a threshold value in a comparator, as is well known in the art.

As the flap profiler array comprises multiple sensors, each with four leads, all of the leads could be connected to a microcontroller for selected LED/Detector activation. Assuming 23 sensors are present, this would require 4×23=92 connections. Preferably, however, the multiplexing circuit of FIG. 6 is employed.

Figure 10:
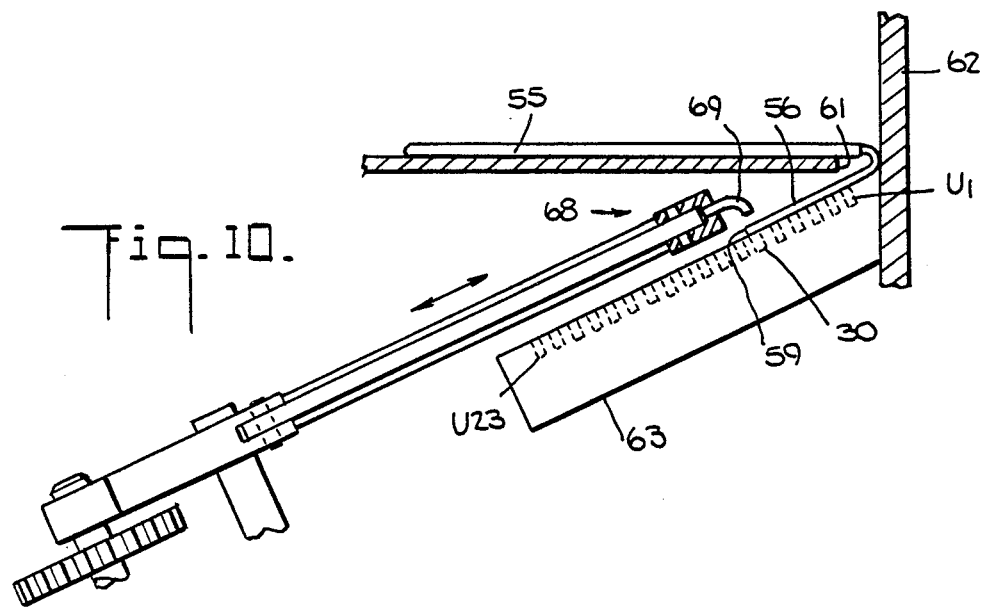

A preferred activation sequence is used in the profiler of the invention, which will now be described in connection with FIGS. 5 and 7-9. FIG. 7 schematically illustrates the method of the invention. An envelope 55 with open flap 56 with the glue line designated by 57 is transported horizontally in FIG. 7 by means not shown across the top of a sensor array 30 extending transverse to the envelope flow direction indicated by the arrow. During the time interval that the envelope takes to pass over the sensor array 30, the latter is activated multiple times. Since the activation time is small, typically about 5-10 uS, the envelope 55 moves only a small amount. Thus, the multiple activation is the equivalent of multiple scans by the array of the envelope, depicted in FIG. 8 by the vertical dashed lines 58 (for complete accuracy, the scan lines should be shown slanted to indicate the envelope motion). For a typical No. 10 envelope moving at the rate of 4 envelopes per second, about 100 scans 58 of the envelope occur. Each scan 58 locates a point on the edge 59 of the envelope flap. During the transport process, the flap 56 is not flat, but is actually folded over the flap fold line 60 to form an angle of about 45° with the envelope body 55. This is illustrated in a side view in FIG. 10 and a top view in FIG. 11. The folding takes place over a machine deck edge 61 which is spaced from a registration wall 62 for all envelopes. The top side of the flap then moves along a plate 63 into which the sensor 30 is embedded. The normal paper tension keeps the flap 56 against the plate 63 as it is moved past the sensor 30. The moistener 58 is located just downstream of the sensor 30 and is moved in the direction indicated by the arrows (FIG. 10) to follow the glue line. The flap height 70 (FIG. 7) is thus measured from the envelope registration wall 62 to its edge 59. Due to space restrictions between edge 61, wall 62 and plate 63, it is difficult to locate the first unit U1 of the sensor array right up against the wall 62. So there is a gap between the first unit U1 and the wall 62. To generalize the flap 22 measurement, virtual detectors are created to extend into that gap, to the right of U1, which will be elaborated on below. The point here is that the profile map is accurate over the large range of enevlope sizes processed by the machine, because virtually all envelopes locate their glue lines by using the same reference edge 60, and the glue lines tend to have similar shapes and geometries. Moreover, the flap 56 stays in contact with the same registration wall 62 and plate 63 as it passes the spray nozzle 58 and thus the relative position of the flap is the same both over the sensor 30 and when it passes subsequently under the sprayer 58. The information comprising the scan number and the edge location points thus constitutes a record, stored in a computer or controller 51, that is mapped to the flap profile, and can readily be used by the computer to calculate the appropriate position of the water sprayer 58, located just downstream of the profiler, and the computer can then send out the appropriate drive currents along the lines 77 to the sprayer motor drive so it is caused to follow the flap glue line 57 as the envelope passes over the sprayer, taking into account the envelope velocity. This is described in copending applicaton, Ser. No., 291,844 whose contents are hereby incorporated by reference. The information collected will also determine the size of the flap, both length and depth. Longer envelopes with longer flaps will allow more scans to be made, and the depth of the flap can be calculated from the length of the edge. From this information, which appears in the record stored by the computer, can also be determined by calculation the size of the glue line and thus the volume of water needed to be sprayed to ensure complete moistening, and this information in turn passed on by line 78 to control a water pump for the moistener. FIG. 11 also shows one of the sensors 79 used to track the position of the moistener.

The record stored by the computer or controller 51 which maps the profile of the envelope flap essentially consists of a table comprising scan number, pointer position number (#), and Flap-length counter values at the end of each session or scan. Since the scan rate is constant for all envelopes, and the velocity of each envelope across the sensor array is known (this information was obtained from the singulator which is just upstream of this sensor), it is straight forward to create a look-up table for the computer to use which directly correlates the sensor record to the appropriate moistener drive system current and water volume requirements needs for proper moistening of each envelope.

The resolution of the system is remarkable. For the sensors whose dimensions were given in connection with FIGS. 1 and 2 above, the effective minimum length measurements that can be made is about 0.085". This is approximately one-half the package length of the sensors. If the distance traveled by the envelope during a scan is less than 0.085", then the 23-unit sensor can provide approximtely 16-18 edge position measurements over a flap length of about 1.7". This resolution is more than sufficient to accurately position the sprayer to ensure the sprayed water is confined to the glue line. The 0.085" dimension corresponds to the spacing between adjacent positions O-X depicted in FIG. 4. If the envelope were stationary, the 23-unit sensor would provide 45 edge positions over a distance of about 3.96".

In the preferred method for activating the sensor array, only a subset of LEDs are activated, one at a time during each scan, and only a subset of detectors are read during each scan. The concept is, simply, to create a moving active array window by only activating the sensors in the vicinity of the flap edge. The flap edge is located at the first activation, and since multiple scans are made at a high speed, rarely does the flap edge move more than two positions from the previous scan. Hence, as the flap edge moves, move the array window to track the edge and only activate the sensor units in the vicinity of the flap edge, on both sides, so that both increasing and decreasing flap lengths can be detected. It is unnecessary to activate sensor units remote from the flap edge, as they contribute no useful information to the computer. Moreover, by using this novel method, not only is the S/N ratio increased, but also sensor activation time is greatly reduced while maintaining high resolution, thus allowing if desired increased scans for more accuracy. The sensor controller controls the selection of which LEDs to turn on (by applying a current pulse) during each scan and during successive scans, and also which detector outputs to sense or read. The controller maintains a record in storage which contains a pointer position, a sum register for storing an initial count (chosen as 4), and logic circuitry for increasing and/or decreasing the register count of a Flap-Length register by either 1 or 2 depending on the read detector outputs and the sum register count.

During each scan as the envelope moves along past the array, from 2–4 LEDs are turned on, and from 3–5 dectectors are read. Each scan constitutes a session. Before the first session begins, the pointer number is initialized to that of the first non-illuminated detector. If no flap has arrived, the pointer position would be at No. 0 (see FIG. 4). The sum counter is initialized to a count of 4; the counter value represents the number of illuminated detectors per session. By assigning a value of 4, it's as if there were 4 detectors in FIG. 4, to the left of detector D0, which are illuminated; these four detectors, not real of course, are referred to as virtual detectors per session. During each session, 2–5 detectors are read, at least two on each side of the pointer. For each LED that is turned on during a session, two detectors are read and the count accumulated. The same detector typically gets read twice, each time the adjacent LED is turned on. If illuminated twice, it contributes a count of two to the accumulator. Now, if the total number of illuminated detectors counted during the session is greater than 4, it means that the flap during this session overlaps more detectors that during the previous session, which means the flap height, measured vertically in FIG. 8, has increased. The Flap-Length counter in the controller which keeps track is thereupon increased and the pointer by a like amount. If the total count is smaller than 4, it means that the flap is overlapping fewer detectors, and the Flap-Length counter, as well as the pointer, is reduced. The Flap-Length counter should be incremented (positively, or decremented if negative) according to the following:

| No. of Non-illuminated detectors | No. of increments |
| --- | --- |
| 7–8 | 2 |
| 5–6 | 1 |
| 4 | 0 |
| 2–3 | −1 |
| 0–1 | −2 |

This algorithm works because we have assumed at the home position No. 0 (no flap), 4 illuminated virtual detectors in order to generalize the algorithm. Moreover, to make the processing time uniform, regardless of the flap position, and to keep it short, we turn on 5 LEDs per session at the maximum. Therefore, the implementation is slightly different for odd and even detectors. The table illustrated in FIG. 9 describes the sequence.

Referring first to FIG. 4, pointer position No. 0, corresponds to a combination of one LED and one detector; thus for every detector, which can receive radiation from each of two adjacent LEDs, there are 2 positions. Thus, for n units, 2n−1 positions. As mentioned, most detectors are read twice, once for each adjacent LED. In the table of FIG. 9, the "pointer at #" column corresponds to the Pos numbers in FIG. 4, which will be explained below. Note that when the pointer is at the home position, No. 0, corresponding to Pos 0, the initial value of the sum counter is not zero but 4. The UP CNT columns give the number of illuminated detectors needed to change to a higher level, indicating more flap, by incrementing the Flap-Length counter 1 or 2; The DOWN CNT columns give the number of illuminated detectors needed to change to a lower level (less flap) by decrementing the Flap-Length counter by 1 or 2. The CNT UP and DOWN numbers are different for odd and even positions.

As an example, which is not to be deemed limiting, we assume in FIG. 4 that the flap edge 59 is positioned at Pos 7 and, as a result of the previous session, the pointer is at position No. 8, the first non-illuminated detector position. In the next session, LED Nos. E2, E3, E4, and E5 will be used, and detectors D2 to D6 will be read, in sequence, two at a time via the two output lines Data 5, Data 6 of FIG. 6. Thus, when E2 is ON, D2 and D3 are read, then E3 is activated and D3 and D4 are read, next E4 is activated and D4 and D5 are read, and finally E5 is activated ON and D5 and D6 read. A count is kept in the sum register 75 (FIG. 7) of the number of illuminated detectors during the session. Detectors illuminated by adjacent LEDs are counted twice, and the total aggregate count is recorded in the sum counter 75 in the Controller 51. If there has been no change in the flap position since the previous session, then the number of illuminated detectors will remain at 4; D2 and D3 by reflection from E2, D3 and D4 by reflection from E3; D4–D6 remain non-illuminated. Therefore, the cunter value remains the same for that scan. If the flap had moved one position distance to the right, to Pos 8, shown in phantom at 59', then D4 would have become illuminated when E4 turned ON, and thus the number of illuminated detectors would then sum up to 5, resulting from the table in FIG. 9 in incrementing the Flap-Length counter 76 by +1. Similarly, if the illuminated detector count jumps to 7, the Flap-Length counter is incremented by +2, and correspondingly decremented when the flap height reduces in the other direction.

A benefit of the invention flowing from this method is in case of a malfunction. If one of the LEDs is not functioning, there will be some distortion in the flap shape record. In general, before reaching the disabled LED, the reading will be correct; while using the disabled LED there will be an error of 2; getting above it, will cause a jump in the counter value. However, the overall effect will be minor, mainly because of the large number of scans possible due to shorter sessions. The result at worse will be a very small non-wetted glue line segment, or a small wetted flap portion adjacent the glue line.

There has thus been described apparatus and methods for obtaining a profile record that maps to the shape of an irregular object, which record can then be used to activate other mechanisms for processing the object. While an important application is in the field of mail handling machinery, especially for mapping the profile of a fast-moving envelope flap, the invention is not limited thereto. For example, it could also be used to determine the shape of an object to be picked up by a robot arm. The profile record obtained would be used by the computer to instruct the robot on how large a gripper opening is required to grip and hold the object without damaging same, or how to orient the gripper with respect to the object. Moreover, more or less than the 23 sensors can be used. The illustrative table in FIG. 9 merely shows the changes for 9 of the possible 17 positions that can be measured. The changes for the remaining positions will be evident to those skilled in the art. The controller is a conventional microcontroller, such as the 8051, and can readily be programmed to activate the desired LEDs and detectors for each session.

While the invention has been described and illustrated in connection with preferred embodiments, many variations and modifications as will be evident to those skilled in this art may be made therein without departing from the spirit of the invention, and the invention as set forth in the appended claims in thus not to be limited to the precise details of construction set forth above as such variations and modifications are intended to be included within the scope of the appended claims.

What is claimed is:

1. A method of mapping the profile of a selected edge of an object, comprising the steps:
    (a) providing an array of sensors in fixed relative location to each other,
    (b) causing the selected object edge to displace across the sensor array at a defined rate such that the sensors respectively are caused to change state in response to encountering respective lead portions of the selected object edge,
    (c) while step (b) is being carried out, recording the state change of the respective sensors and a function of elapsed time, and
    (d) determine the selected object edge profile map as a function of the recorded sensor state change as function of elapsed time and the defined object displacement rate.

2. A method of mapping the profile of a selected edge of an object, comprising the steps:
    (a) providing an array of sensors in fixed relative location to each other,
    (b) causing the sensor array to be displaced across the selected object edge at a defined rate such that the sensors respectively are caused to change state in response to encountering respective lead portions of the selected object edge,
    (c) while step (b) is being carried out, recording the state change of the respective sensors and a function of elapsed time, and
    (d) determine the selected object edge profile map as a function of the recorded sensor state change as function of elapsed time and the defined object displacement rate.

3. A method of maping the profile of a selected edge of an opaque object, comprising the steps:
    (a) providing an linear array of photoelectric sensors, each sensor having a emitter and detector aligned cooperatively and in fixed location relative to each other,
    (b) activating the sensor emitters,
    (c) monitoring the output state of the sensor detector,
    (d) causing the selected object edge to displace across the sensor array at a defined rate such that the output state of the respective sensors detectors is caused to change in response to encountering respective lead portions of the selected object edge,
    (e) while step (b) is being carried out, recording the state change of the respective sensors detector as function of elapsed time, and
    (d) determine the selected object edge profile map as a function of the recorded sensor detector state change as function of elapsed time and the defined object displacement rate 4. A method as set forth is claim 3 wherein the step of providing a linear array of photoelectric sensors includes the further steps of:
    providing a mounting member having a transport surface,
    mounting said sensor array in the mounting member such that the emitter and detector elements of the respective sensors are exposed to the transport surface and such that said array is comprised of alternating emitter-detector.

5. A method as set forth in claim 4 wherein the step of causing the selected object edge to displace across the sensor array at a defined rate includes the further step of;
    causing the selected object edge to traverse across the transport surface to encounter the sensors such that light emitted from the respective emitter is reflected off the object on to a respective detector.

6. A method as set forth in claim 5 wherein the step of causing the selected object edge to displace accrues the sensor array at a defined rate includes the further step of;
    causing the light emitted from the respective emitter to further reflect of the object onto the detector of the preceding activated detector.

7. A method of mapping the profile of a selected edge of an opaque mail flap, comprising the steps:
    (a) providing a mounting member having a transport surface,
    (b) mounting a linear array of photoelectric sensors having an emitter and detector in the mounting member such that the emitter and detector elements of the respective sensors are exposed to the transport surface and such that said array is comprised of alternating emitter-detector,
    (c) causing the selected mail flap edge to traverse across the transport surface to encounter the sensors, the sensor being grouped in a plurality sequential banks, such that the mail flap leading edge is caused to first traverse the first of the sensor banks,
    (d) while preforming (c) activating a first bank of sensors and monitor the output state of the sensor detector associated with said sensor bank,
    (e) while performing (c) activating the next bank of sensor, monitor the output state of the sensor detector associated with said sensor bank and turn off preceding sensor bank, if all detector of the proceeding sensor bank have experienced a state change and repeat step (e), if all detector of the proceeding sensor bank has not experienced a state change activate preceding sensor bank and repeat step (e) until first sensor bank has been reactivated,
    (f) while step (e) is being carried out, recording the state change of the respective sensors detector as function of elapsed time, and
    (g) determine the selected mail flap edge profile map as a function of the recorded sensor detector state change as function of elapsed time and the defined mail flap displacement rate.

8. An apparatus for determining the profile of an envelope flap, comprising:
    (a) a envelope transport means for transporting a envelope having the envelope flap spaced from the envelope body;
    (b) a linear array of photoelectric sensors having an emitter and detector supported by said transport means such that the emitter and detector elements of the respective sensors are exposed to the transport surface and such that said array is comprised of alternating emitter-detector pattern,
(c) means for causing the lead edge of the envelope flap to traverse across the sensors, the sensor being grouped in a plurality sequential banks, such that the mail flap leading edge is caused to first traverse the first of the sensor banks,
(d) control means for activate a first bank of sensors and monitor the output state of the sensor detector associated with said sensor bank,
(e) said control means for further activating the next bank of sensor, monitor the output state of the sensor detector associated with said sensor bank and turn off preceding sensor bank, if all detector of the preceding sensor bank have experienced a state change,
(f) said control means for further reactivating preceding sensor bank, if all detector of the preceding sensor bank has not experienced a state change activate preceding sensor bank until first sensor bank has been reactivated,
(g) said control means to further recording the state change of the respective sensors detector as function of elapsed time, and determine the selected mail flap edge profile map as a function of the recorded sensor detector state change as function of elapsed time and the defined mail flap displacement rate.

9. A apparatus for mapping the profile a flap of an envelope, comprising:

(a) a envelope transport means for transporting a envelope having the envelope flap spaced from the envelope body;
(b) a linear array of photoelectric sensors having an emitter and detector supported by said transport means such that the emitter and detector elements of the respective sensors are exposed to the transport surface and such that said array is comprised of an alternating emitter-detector pattern.
(c) means for causing the lead edge of the envelope flap to traverse across the sensors,
(d) control means for activating the emitters and recording the state change of the respective sensors detector as function of elapsed time, and for determine the selected object edge profile map as a function of the recorded sensor detector state change as function of elapsed time and the defined object displacement rate.

10. An apparatus as claimed in claim 3 wherein the sensor are grouped in a plurality sequential banks, such that the mail flap leading edge is caused to first traverse the first of the sensor banks, and the control means further includes means for activate a first bank of sensors and monitor the output state of the sensor detector associated with aid sensor bank, and for further activating the next bank of sensor, monitor the output state of the sensor detector associated with said sensor bank and turn off preceding sensor bank, if all detector of the preceding sensor bank have experienced a state change, and for further reactivating preceding sensor bank, if all detector of the preceding sensor bank has not experienced a state change activate preceding sensor bank until first sensor bank has been reactivated.

* * * * *